Feb. 10, 1948.  W. W. LOEWY  2,435,592
HORIZONTAL AXIS DRUM GRAIN PEELER WITH COOPERATING
RESINOUS AND RUBBER PEELING SURFACES
Filed Jan. 15, 1943
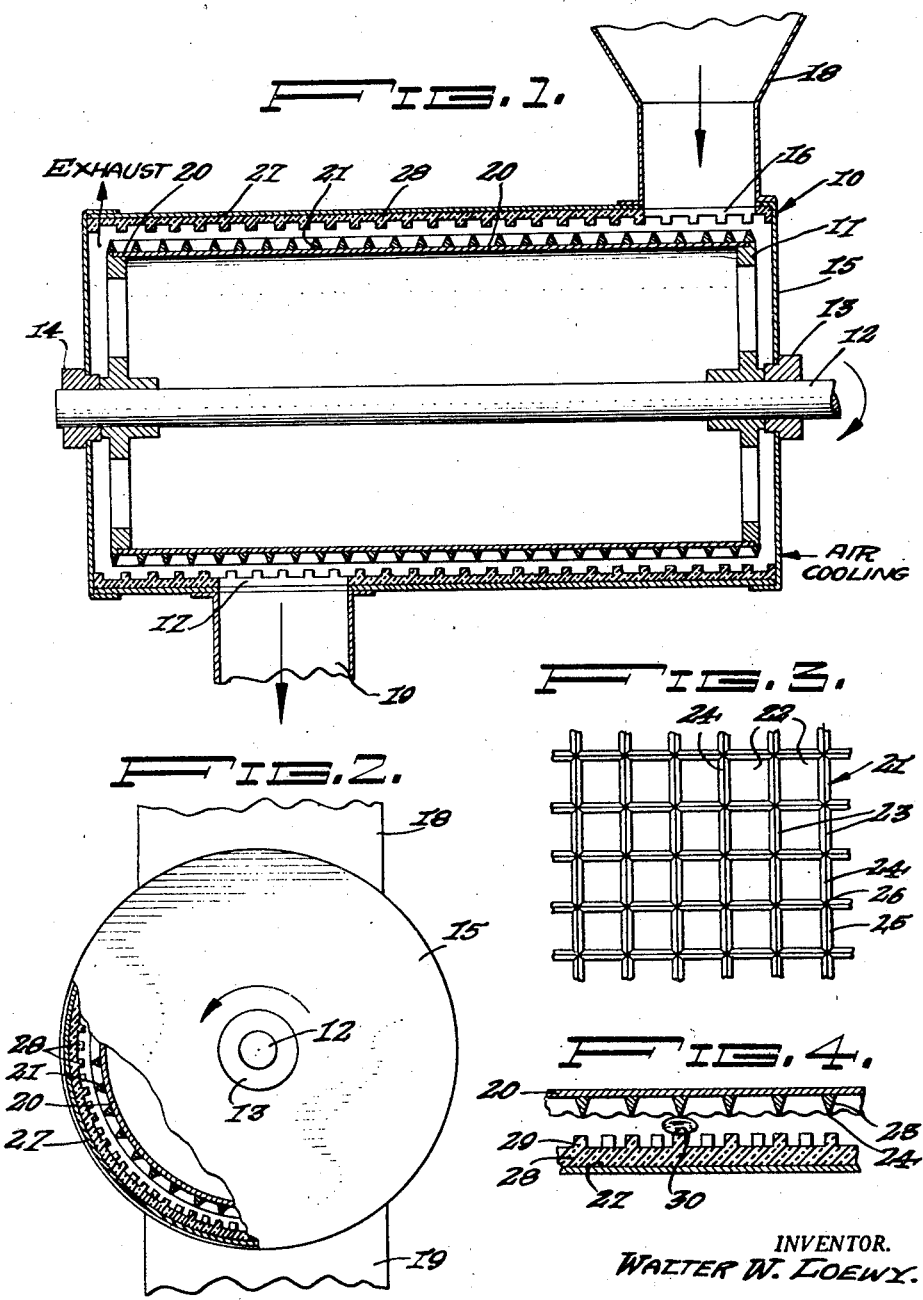
INVENTOR.
WALTER W. LOEWY.

Patented Feb. 10, 1948

2,435,592

UNITED STATES PATENT OFFICE 2,435,592

HORIZONTAL AXIS DRUM GRAIN PEELER WITH COOPERATING RESINOUS AND RUBBER PEELING SURFACES

Walter W. Loewy, New York, N. Y.

Application January 15, 1943, Serial No. 472,459

2 Claims. (Cl. 146—302)

This invention relates to an apparatus for processing grain, seeds and the like, and in particular for peeling wheat, rye, corn and like grains or seeds to remove the hulls or husks from their kernels.

It is an object of the present invention to provide a simple, inexpensive and highly efficient apparatus enabling hulling or peeling of grain or similar goods in a very economical manner and operation, in which any clogging, crushing or injuring of the kernel material during the hulling operation is effectively avoided.

Another object of this invention is to provide an apparatus in which grain, seed or like material is subjected to a husking treatment between striking surfaces, which due to their properties inherent in particular, in the shape, quality and selection of the material of which said surfaces respectively consist, contribute to the attainment of improved and polished grain kernels substantially free from hulls or epidermis covering said grain material.

Yet, another object of the invention is to provide an apparatus of the aforesaid type whose cooperable working surfaces are made of different materials, such as, organic plastic material withstanding slight bending stresses on the one hand, and relatively soft or yieldable rubber on the other hand, whereby improved grain kernels are obtained.

The foregoing objects and other objects, features and advantages of the invention will be pointed out or will become clearly evident from the following detailed description of the invention as embodied in the accompanying drawing. In said drawing, which illustrates a preferred form of the invention—

Fig. 1 is a sectional view in elevation of an apparatus (portions being broken away) made in accordance with this invention.

Fig. 2 is an end view, partly in section, of the apparatus illustrated in Fig. 1.

Fig. 3 is an enlarged detail employable in the apparatus of this invention.

Fig. 4 is a fragmentary cross-sectional view of apparatus parts between which grain material is treated.

Referring now in greater detail to the embodiment, shown in Fig. 1, there is disclosed the sectional view of an apparatus in elevation, made in accordance with this invention. Apparatus 10 has a rotatable drum 11 carried by shaft 12 which is supported in bearings 13, 14 of outer housing or casing 15. Housing 15 is cylindrical and has the diametrically arranged openings 16, 17. Opening 16 connects funnel or hopper 18 with the interior of housing 15, the latter further communicating with the discharge pipe 19 through opening 17. Metallic drum 11 is preferably hollow and carries on its outer surface 20 a honeycomb or mesh-shaping covering or layer 21 made of resinous substance, said covering tightly bearing against the outer curved surface of said drum and being removably and interchangeably fixed in position thereon by any known and suitable attaching means (not shown). Cover 21 is preferably constituted by a plurality of squares 22. Walls or ribs 23 confining each square 22 are tapered in cross-section and terminate into relatively sharp edges 24 which may extend in somewhat arcuate or wavy lines 25 intersecting with one another, as at 26.

Covering 21 may be made of any organic plastic substance, such as acrylic acid or methyl methacrylate resin (known as "Lucite" or "Vinylite") which substance yields slight bending stresses without breaking, has a low coefficient of heat transmission and is not chemically attacked by grain hulls or other constituents of the grain or seed material. Instead of resinous substances any other mass having substantially the aforesaid properties may be selected, such as relatively soft glass, quartz and the like.

Fig. 3 shows a portion of the grid- or mesh-shaped covering or layer 21 in approximately natural size. The inner surface 27 of housing 15 is equipped with lining 28 having studs or projections 29 as clearly seen in Fig. 4. This lining and its projections are preferably made of soft rubber. The distance between rubber lining 28 and covering 21 of plastic material is very restricted and so chosen that a relatively small gap is obtained therebetween, whereby grain, wheat or other seeds 30 may be subjected to the treatment of separation of hulls or husks from their kernels.

According to this invention wheat material which has been previously moistened on its hull or outer surface only (for example by steam, water spray or any suitable moist atmosphere, for example, such as indicated in Fig. 1 of my U. S. Letters Patent No. 2,355,810, dated August 15, 1944) is continuously fed through funnel 18 and opening 16 into the interior of apparatus 10 while drum 11 is rotated relatively to lining 28 at very high speed through any known power source and transmission system (not shown). Within a relatively short time (about one minute) the grain kernels leave the opening 17 and discharge pipe 19 free from their hulls and well polished, whereas the hulls are finely crushed and subsequently removed from apparatus 10.

It is to be understood that practical experience has shown that this apparatus produces an unobvious result in that the hulls are so thoroughly removed from their kernels which in turn are so well polished and cleaned when they are collected that it is supposed that this result may be due to electrostatic effects produced between the plastic or resinous covering 21 and the rubber lining 28, but may also be due to the heat development in the gap between cover 21 rotating at very high speed relatively to rubber lining 28. This heat is retained in the cover material as well as in the rubber material. When grain material which has been previously moistened at its outer surface is placed within this gap, the grain material will be subjected to a surface treatment due to friction and heat whereby without affecting the kernels, the hulls are opened by virtue of the surface tension developed thereon.

It will be observed that each of the squares or sections 22 of the grid-shaped cover 21 can only receive and transport a certain number of grain kernels which are being subjected to the frictional treatment by rubber lining 28, 29 against which they are propelled from said sections 22. Thus, the grain kernels are not only brought into frictional engagement with one another but are also continuously fed and moved from one to another and along the covering sections thereby pressed for contact with the edges 24, 25 of the grid-shaped cover by the yieldable rubber projections 29.

The drum 11 may rotate at a rate between 500 to 3000 revolutions per minute, and due to its coarse or gripping cover (which may be suitably shaped for the purpose intended) carries grains fed from hopper 18 forwardly in the direction of and to the discharge end 29, while the grains are thereby subjected to peeling or hull separating actions. The grain kernels leaving said discharge end are not only freed from their outer coverings, but also from most of the inner bran epidermis without injury to the kernels. It is preferable to utilize the mentioned cooling air stream and/or the exhauster means to facilitate separation of the split or removed hulls from the grain kernels during the propelling and ensuing peeling operation.

The apparatus may work either continuously or intermittently. Instead of a rubber or yieldable lining, which is preferred, it may be advisable, in some instances, to employ a working surface made of organic plastic (resinous) substance, such as proposed for cover 21.

The particular shape of the apparatus parts (cylindrical housing and drum) may be changed, if desired, and may assume a form, such as disclosed in Fig. 4 of my U. S. Letters Patent No. 2,355,810, dated August 15, 1944.

The hull material removed from wheat or similar grain may be in comminuted form and contains approximately 32% pentoses and over 16% furfurol, the latter constituting a very desirable starting material for technical purposes. Since the kernels will neither be crushed nor otherwise injured, important vitamins contained in the kernels will not be lost and remain in the flour, the appearance of which is considerably improved due to the efficient peeling operation in the hereinabove described apparatus.

Having thus described the invention, what is claimed as new and desired to be secured by Letters Patent is:

1. In an apparatus of the character described having a rotatable drum and housing therefor, a grid-shaped covering of resinous material on the drum surface, said housing having an inner surface lining of yieldable material provided with projections, means to rotate said covering relatively to said lining, means for feeding surface moistened grain material onto said drum covering, whereby said grain material is propelled against said housing lining and projections and then pressed by the latter for contact with said covering to thereby split open the hulls of said grains and to free the latter from said hulls, and means for forwardly moving said grain material on said drum.

2. An apparatus for separating the hulls from wheat, grains and similar kernel material comprising two members, one of which having an arcuate surface, the other of which having a rotary surface cooperating with said arcuate surface, and means for rotating one surface relatively to the other, the surface of one of said members being provided with a yieldable rubber layer having projections, the surface of the other member being provided with a substantially grid-shaped layer of resinous material, said resinous layer terminating into sharp edges opposite said projections, said layers being arranged at a distance from one another so as to permit propelling of grain fed onto one of the layers against the other of said layers, whereby the hulls are pressed for contact with said sharp edges so as to separate said hulls from the kernels of the grain.

WALTER W. LOEWY.

REFERENCES CITED

The following references are of record in the file of this patent:

UNITED STATES PATENTS

| Number | Name | Date |
| --- | --- | --- |
| 6,644 | Walker | Aug. 14, 1849 |
| 348,826 | Crawford | Sept. 7, 1886 |
| 499,598 | Schell | June 13, 1893 |
| 1,570,081 | Ross | Jan. 19, 1926 |
| 1,737,071 | Birnie | Nov. 26, 1929 |
| 2,208,077 | Linke | July 16, 1940 |
| 325,919 | Deobold | Sept. 8, 1885 |
| 2,222,776 | Linke et al. | Nov. 26, 1940 |
| 664,533 | Clark | Dec. 25, 1900 |
| 2,138,302 | Kilner | Nov. 29, 1938 |
| 2,165,946 | Smith | July 11, 1939 |
| 2,140,048 | Fikenstscher et al. | Dec. 13, 1938 |

OTHER REFERENCES

"Methacrylate Resins," by Strain et al., from Industrial and Engineering Chemistry, April 1939, pages 382–387. (Photostat in Div. 50.)

"Artificial Resins," by Scheiber and Sandig. Textbook printed by Sir Isaac Pilman & Sons Ltd., London and New York, pages 362–364. (Copy in Division 50.)

"Koroseal, a New Plastic," by Brous, Industrial and Engineering Chemistry, June 1935, pages 667–672; especially Fig. 7 on p. 668. (Photostat in Division 50.)